United States Patent Office 3,285,894
Patented Nov. 15, 1966

3,285,894
POLYMERIZATION INITIATORS COMPRISING ALKALI METAL ALCOHOLATES
Drahoslav Lím and Jiří Trekoval, Prague, Czechoslovakia, assignors to Ceskoslovenska akademie ved, Prague, Czechoslovakia
No Drawing. Filed Oct. 11, 1963, Ser. No. 315,679
9 Claims. (Cl. 260—88.7)

This invention relates to polymerization initiators, and more particularly to the polymerization of organic monomers having ethylenic double bonds, to initiators for such polymerization, and to a method for preparing the initiators.

In its more specific aspects, the invention is concerned with polymerization initiators which are alkali metal alcoholates derived from tertiary alcohols, and the methods of making and using the same.

It is known that stereoregular polymers are frequently obtained by anionic polymerization of monomers having ethylenic double bonds initiated by organometallic compounds, such as butyl lithium. Dienes, such as isoprene, are polymerized by butyl lithium to regular 1,4-cis polydienes. Primary and secondary alcoholates of alkali metals have previously been proposed as initiators for anionic polymerization. Tertiary alcoholates have heretofore been applied as condensation-inducing agents in organic synthesis, but not in the polymerization of monomers of the aforedescribed type.

The organometallic compounds heretofore employed for anionic polymerization are very active catalysts. Their reactivity frequently is too high to permit adequate control, giving rise to side reactions with the monomers and with such usually unavoidable trace impurities as oxygen and water. Methyl methacrylate monomer, for example, reacts with alkyl lithium in a manner which makes the alkyl lithium unavailable for the desired catalytic effect, so that a substantial excess of catalyst over that actually needed to initiate polymerization must be employed. Residual catalyst in the polymer may impair dielectric and other properties of the polymer, yet such residues cannot be safely avoided.

We have found that alcoholates of alkali metals with tertiary alkanols having 4–12 carbon atoms, when employed singly or in conjunction with alkyl lithium compounds initiate anionic stereospecific polymerization of monomers having ethylenic double bonds, and permit to overcome the shortcomings of the known organometallic initiators. The initiators of the invention are applicable to polymerization and copolymerization of all monomers known to be capable of polymerization by anionic catalysts, more particularly to esters and nitriles of acrylic and methacrylic acid with alkanols having one to eighteen carbon atoms.

The initiators of the invention do not cause undesired side reactions, and polymerization can be readily controlled. Their activity is high enough to permit polymerization to be carried out at very low temperature at practical polymerization rates. The monomeric esters of acrylic and alkacrylic acids from polymers of stereoregular structure when polymerized at temperatures below 10° C. with the initiators of the invention.

Any alkyl lithium compound or other alkyl alkali metal compound of the formula R—Me wherein R is an alkyl radical having at most 12 carbon atoms and Me is an alkali metal can be used as an initiator together with the above-mentioned tertiary alcoholates but the lowest alkyl lithium compounds are not adequately soluble, and those with more than 6 carbon atoms are less active and not readily available. Butyl lithium is most convenient from the above points of view, although, e.g., amyl-, hexyl- or phenyl lithium are very satisfactory.

We have found that the polymers produced from alkyl and aryl acrylates, and alkacrylates, and the nitriles of the corresponding acids in the presence of tertiary alkylates of lithium, sodium, sodium, and potassium are isotactic, as determined by their infrared spectra and their nuclear magnetic resonance. Methyl methylacrylate is typical of the monomers suitable for the method of the invention. Its polymerization proceeds evenly at temperatures between —40° C. and +20° C. The induction period is short, and its length is inversely proportional to the amount of catalyst present. At temperatures above 10° C., the growing carbon chain of the polymer reacts with the ester group, and branching ensues. Branching eventually can lead to the production of three-dimensional polymers insoluble in conventional solvents, such as in acetone, benzene and chloroform.

The alkali metal tert-alcoholates of the invention, particularly the lithium tert-alcoholates, are readitly prepared in a state of high purity. The lithium tert-alcoholates of the invention may be purified by sublimation in a vacuum without decomposition.

The alcoholates of alkali metals such as lithium according to the invention may be prepared by conventional methods. It has been found by us that they are also prepared very conveniently by reacting alkyl lithium with an ester of a carboxylic acid in which the carbon atom in alpha position carries at most one hydrogen atom. Typical starting materials for our method are esters of pivalic acid, isobutyric acid, and their homologs. The reaction proceeds smoothly over a wide range of conditions. When the alkyl lithium is present in excess of the amount required for the reaction with the ester, a complex compound composed of equimolecular amounts of the lithium tert-alcoholate and of the alkyl lithium is obtained directly. The product is identical with the complex compound obtained by mixing the components in liquid form, for example, in solution, removing the solvent by evaporation, and recrystallizing the residue from a suitable solvent, for example, hexane, heptane or mixtures of lower alkanes. The complex compounds of sodium and potassium alcoholates with alkyl lithium are readily prepared by the last-mentioned method.

The complex compounds have characteristic infrared spectra and are quite stable when protected from a reactive environment. The complex compound obtained from equimolecular amounts of lithium tert-butylalcoholate and butyl lithium by evaporating their solution in a common solvent and recrystallizing the residue from hexane is a crystalline material which ignites in contact with atmospheric oxygen. Its catalytic activity is similar to that of butyl lithium, but somewhat milder, and therefore more readily controllable. It leads to cleaner polymers. The catalytic activity of the complex compound, whether employed as a crystalline solid or as a joint solution of the components, is high.

The invention will be further illustrated by the following examples, but it will be understood that it is not limited thereto.

*Example 1*

1,1-dimethylbutanol was prepared in a conventional manner by reacting ethyl butyrate with methylmagnesium iodide. A suspension of an excess of lithium metal in benzene was reacted in a flask with 1,1-dimethylbutanol by heating 2–3 hours under a reflux condenser. The unreacted lithium was filtered off, and residual traces of the tertiary alcohol were removed together with the benzene by distillation. The residue in the distillation flask was purified by sublimation at 170° C. and at a pressure 0.01 mm. Hg. Lithium tert-hexanolate was obtained as a clear, glass-like material coating the cooler walls of the flask. It is readily soluble in liquid aromatic hydrocarbons. As determined by titration, the purity of the alcoholate was 99.9%.

0.5 part of the lithium tert-hexanolate were dissolved in 10 parts toluene, and the solution was added to 100 parts methyl-methacrylate at 0° C. under an inert (nitrogen) atmosphere free of $CO_2$, water and oxygen. After 12 hours standing at 0° C., the methacrylate was converted to a block of polymer having isotactic structure. A 100% conversion was achieved by letting the block stand at 20° C. for one day. The polymer was partially insoluble in all conventional solvents.

An inert atmosphere of the same kind was used also in the following examples.

*Example 2*

A mixture of 0.1 part secondary butyl lithium and 0.12 part lithium tert-butanolate was combined with 100 parts methyl methacrylate at −20° C. in an inert atmosphere. A solid block of polymer having isotactic structure was formed within seven hours.

*Example 3*

100 parts methyl-methacrylate were polymerized at −20° C. under an inert atmosphere with an initiator prepared by dissolving 0.25 part n-butyl lithium and 0.35 part lithium tert-hexanolate in 10 parts toluene. A solid block of polymer having an entirely isotactic structure was formed in five hours.

*Example 4*

100 parts pure anhydrous acrylonitrile were dissolved in 200 parts petroleum ether, and 0.2 part lithium tert-butanolate were admixed to the solution at −20° C. in an inert atmosphere. The polymer formed precipitated spontaneously from the liquid phase. It was separated from the liquid by filtration and washed with a dilute aqueous solution of a wetting agent and then with distilled hot water (50° C.), and finally dried.

*Example 5*

100 parts butyl acrylate were mixed at 0° C. in an inert atmosphere with 0.5 part lithium-tert-butanolate in a flask. When the contents of the flask showed an appreciable increase in viscosity, the flask was externally cooled with a mixture of ice and common salt. A tough, transparent block of polymer was obtained.

*Example 6*

10 parts methyl-pivalate were dissolved in 100 parts benzene. 15 parts butyl lithium were added to the solution at 0° C. in an inert atmosphere. The solution so obtained was added after several minutes in a ratio of 1:100 to anhydrous, freshly distilled methylmethacrylate that had been cooled to −10° C. After six hours of polymerization at that temperature, there was obtained a block of polymethylmethacrylate having a fully isotactic structure.

*Example 7*

100 parts n-dodecyl methacrylate were polymerized by means of 0.4 part sodium tert. butanolate in an inert atmosphere at +20° C. After 8 hours a block of solid polymer was obtained.

*Example 8*

100 parts octadecyl methacrylate were polymerized at +20° C. in an inert atmosphere by means of 0.4 part potassium tert. butanolate. After 12 hours a block of a wax-like polymer was obtained.

*Example 9*

100 parts dodecyl acrylate were mixed at +20° C. in an inert atmosphere with 0.4 part lithium tert. hexanolate. After 6 hours the polymerization was finished and a solid block of polymer was obtained.

*Example 10*

100 parts butyl methacrylate and 0.2 part ethylene glycol dimethacrylate were copolymerized at 0° C. by means of 0.5 part lithium tert. hexanolate in an inert atmosphere. After about 6 hours a block of solid insoluble three-dimensional polymers was obtained.

*Example 11*

10 parts ethyl isobutyrate were dissolved in 100 parts toluene, and to the solution thus obtained 15 parts butyl lithium were added under an inert atmosphere. The solution was added in a ratio 1:100 to methyl methacrylate which was cooled down to −10° C. After 6 hours polymerization at the same temperature, a solid block having more than 90% of isotactic polymer was gained.

Instead of alkali metal alcoholates derived from tertiary monoalcohols, alcoholates derived from tertiary glycols can be used, e.g., di-lithium 1,1,4,4-tetramethyl butandiolate of the formula

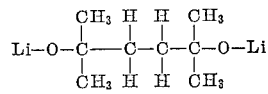

and like compounds. Said butandiolate can be readily prepared from 1,4-dichlorobutane in a conventional manner.

The degree of branching of the polymers produced is related to the temperature at which polymerization is carried out, as has been set forth hereinabove. When methyl-methacrylate is polymerized according to our method at a temperature sufficiently high to produce a high degree of branching, the polymers may be plasticized with relatively small amounts of conventional plasticizers. The plasticized polymers are very tough, and have high impact strength. They highly resist surface scratching. They may also be shaped into clear, soft films and foils by conventional methods. The plasticizer, and even a volatile solvent, e.g., the remaining monomer, is firmly held by the branched polymethyl-methacrylate. The perfect transparency of these stereoregular polymers is probably due to the fact that their structure is not entirely linear.

While the invention has been described with particular reference to specific embodiments, it is to be understood that it is not limited thereto, but is to be construed broadly and restricted solely by the scope of the appended claims.

We claim:

1. A method of polymerizing a polymerizable monomer selected from the group consisting of acrylonitrile and the esters of acrylic acid and methacrylic acid with alkanols having one to eighteen carbon atoms, which method comprises admixing to said monomer an alkali metal alcoholate of a tertiary alkanol having four to twelve carbon atoms at a temperature between −40° C. and +20° C.

2. The method as set forth in claim 1, wherein the alkali metal is lithium.

3. The method as set forth in claim 1, which further comprises admixing to said monomer an alkyl alkali metal compound of the formula R—Me wherein R is an alkyl radical with at most 12 carbon atoms and Me is an alkali metal.

4. The method as set forth in claim 1, wherein said alkali metal alcoholate is admixed to said monomer in the form of a complex compound of said alkali metal alcoholate with an alkyl lithium compound having four to six carbon atoms in the alkyl radical thereof.

5. A method as set forth in claim 1, wherein said tertiary alkanol is tert-butanol.

6. A method as set forth in claim 1, wherein said tertiary alkanol is tert-hexanol.

7. A method as set forth in claim 1, wherein said tertiary alkanol is 1,1,4,4-tetramethylbutane-1,4-diol.

8. A method as set forth in claim 3, wherein R is an alkyl radical having four to six carbon atoms and Me is lithium.

9. A method as set forth in claim 3, wherein R is butyl and Me is lithium.

References Cited by the Examiner

UNITED STATES PATENTS

| | | | |
|---|---|---|---|
| 2,856,391 | 10/1958 | Diem | 260—94.2 |
| 2,927,086 | 3/1960 | Gordon et al. | 252—431 |
| 2,939,846 | 6/1960 | Gordon et al. | 252—431 |
| 2,985,594 | 5/1961 | Zimmermann | 252—431 |
| 3,087,919 | 4/1963 | Wilkinson | 260—88.7 |
| 3,088,939 | 5/1963 | Miller | 260—88.7 |
| 3,098,060 | 7/1963 | Miller | 260—88.7 |
| 3,105,828 | 10/1963 | Porter | 260—94.2 |
| 3,147,242 | 9/1964 | Stearns | 260—94.2 |
| 3,177,186 | 4/1965 | Miller | 260—89.5 |

JOSEPH L. SCHOFER, *Primary Examiner.*

DONALD E. CZAJA, *Examiner.*

H. WONG, *Assistant Examiner.*